US012121831B2

(12) United States Patent
Paz et al.

(10) Patent No.: US 12,121,831 B2
(45) Date of Patent: Oct. 22, 2024

(54) BACKFLUSH FILTER ASSEMBLY

(71) Applicant: Rosedale Products, Ann Arbor, MI (US)

(72) Inventors: Jose Ignacio Paz, Ann Arbor, MI (US); Dennis Miles Findley, Tecumseh, MI (US); Mark Andrew Lunde, Saline, MI (US)

(73) Assignee: Rosedale Products, Ann Arbor, MI (US)

( * ) Notice: Subject to any disclaimer, the term of this patent is extended or adjusted under 35 U.S.C. 154(b) by 0 days.

(21) Appl. No.: 18/407,612

(22) Filed: Jan. 9, 2024

(65) Prior Publication Data

US 2024/0139653 A1   May 2, 2024

Related U.S. Application Data

(62) Division of application No. 17/567,520, filed on Jan. 3, 2022, now Pat. No. 11,904,261.

(Continued)

(51) Int. Cl.
*B01D 29/15* (2006.01)
*B01D 29/33* (2006.01)
(Continued)

(52) U.S. Cl.
CPC ............. *B01D 29/15* (2013.01); *B01D 29/33* (2013.01); *B01D 29/52* (2013.01); *B01D 29/58* (2013.01);
(Continued)

(58) Field of Classification Search
CPC ........ B01D 29/15; B01D 29/33; B01D 29/52; B01D 29/58; B01D 29/661; B01D 35/16; B01D 2201/202; B01D 2201/302; B01D 2201/304; B01D 29/27; B01D 29/56; B01D 29/13; B01D 29/31; B01D 29/50;
(Continued)

(56) References Cited

U.S. PATENT DOCUMENTS

| 310,049 A | 12/1884 | Granger |
| 1,447,816 A | 3/1923 | Peelle |

(Continued)

FOREIGN PATENT DOCUMENTS

| KR | 20170000352 U | 1/2017 |
| KR | 101820916 B1 | 1/2018 |

OTHER PUBLICATIONS

"Notice of Decision to Grant Received for China Patent Application No. 202230192125.4, mailed on Jul. 1, 2022", 2 pages.

*Primary Examiner* — Waqaas Ali
(74) *Attorney, Agent, or Firm* — Billion & Armitage

(57) ABSTRACT

A filter element includes an inner filter basket including an elongated tubular portion having a first open end and a first closed end. The tubular portion defines a plurality of perforations therethrough. An outer surface of the tubular portion is seamless. A first annular brim extends outwardly from the open end of the tubular portion. The filter element also includes an outer filter basket having a second open end in which the inner filter basket is received. A second annular brim extends outwardly from the second open end of the outer filter basket. The fabric filter bag is disposed between the inner filter basket and the outer filter basket.

12 Claims, 13 Drawing Sheets

Related U.S. Application Data

(60) Provisional application No. 63/142,622, filed on Jan. 28, 2021.

(51) Int. Cl.
  *B01D 29/52* (2006.01)
  *B01D 29/58* (2006.01)
  *B01D 29/66* (2006.01)
  *B01D 35/16* (2006.01)

(52) U.S. Cl.
  CPC ........... *B01D 29/661* (2013.01); *B01D 35/16* (2013.01); *B01D 2201/202* (2013.01); *B01D 2201/302* (2013.01); *B01D 2201/304* (2013.01)

(58) Field of Classification Search
  CPC .... B01D 29/66; B01D 35/30; B01D 46/0002; B01D 46/0005; B01D 46/02; B01D 46/2411
  See application file for complete search history.

(56) References Cited

U.S. PATENT DOCUMENTS

| | | |
|---|---|---|
| 2,827,639 A | 3/1958 | William |
| 3,071,781 A | 1/1963 | Benjamin |
| 4,027,901 A | 6/1977 | Forni |
| 4,419,240 A | 12/1983 | Rosaen |
| 4,701,259 A | 10/1987 | Rosaen |
| 4,738,696 A | 4/1988 | Staffeld |
| 4,769,052 A * | 9/1988 | Kowalski ............... B01D 46/06 210/417 |
| 5,462,678 A | 10/1995 | Rosaen |
| D415,831 S | 10/1999 | Hall et al. |
| D476,725 S | 7/2003 | Dushek et al. |
| D706,908 S | 6/2014 | Knapp |
| 10,661,204 B2 | 5/2020 | Dobak et al. |
| 2010/0270231 A1 | 10/2010 | Rosaen |
| 2011/0001293 A1 | 1/2011 | Chen |
| 2012/0223485 A1 | 9/2012 | Heo |
| 2014/0053327 A1 | 2/2014 | Lee |

\* cited by examiner

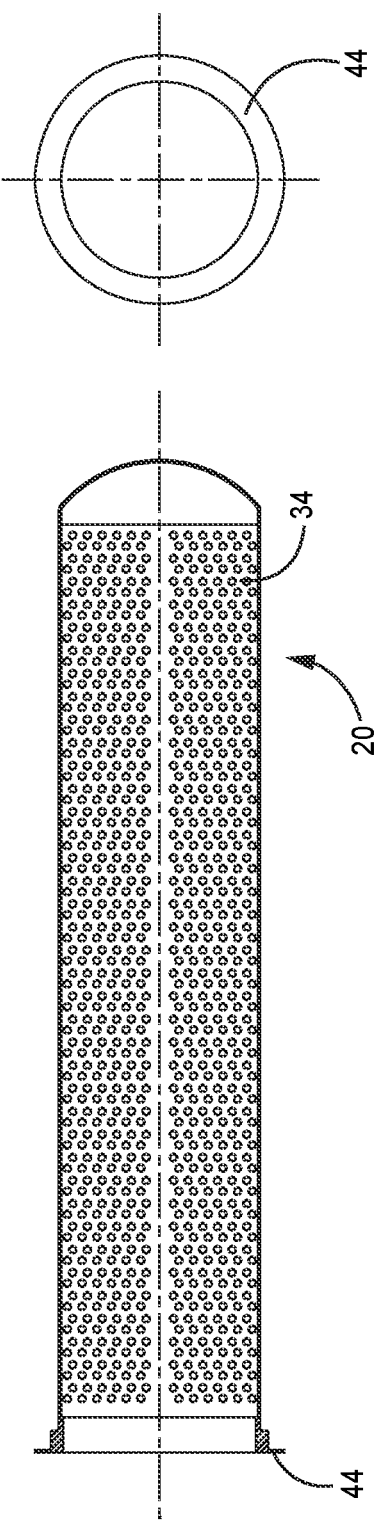

BACKFLUSH FILTER ASSEMBLY

CROSS-REFERENCE TO RELATED APPLICATION

This application is a divisional application of Ser. No. 17/567,520 titled "Backflush Filter Assembly" and filed on Jan. 3, 2022, which claims benefit of priority to U.S. Application No. 63/142,622 titled "Backflush Filter Assembly" and filed on Jan. 28, 2021, the entire disclosure of each of which is hereby incorporated by reference.

TECHNICAL FIELD OF THE INVENTION

The invention generally relates to a filter element configured to remove particulates and other contaminants from fluids, particularly to replaceable bag-type filter elements.

SUMMARY

In some aspects, the techniques described herein relate to the filter element, including: an inner filter basket including an elongated tubular portion having a first open end and a first closed end, the tubular portion defining a plurality of perforations therethrough, wherein an outer surface of the tubular portion is seamless and wherein a first annular brim extends outwardly from the open end of the tubular portion; and an outer filter basket having a second open end in which the inner filter basket is received, wherein a second annular brim extends outwardly from the second open end of the outer filter basket, wherein the fabric filter bag is disposed between the inner filter basket and the outer filter basket.

BRIEF DESCRIPTION OF THE DRAWINGS

The present invention will now be described, by way of example with reference to the accompanying drawings, in which:

FIGS. 5A-5C are side, end, and perspective views of the inner filter basket of the filter element of FIG. 4 according to some embodiments;

DETAILED DESCRIPTION

Figure 1A:
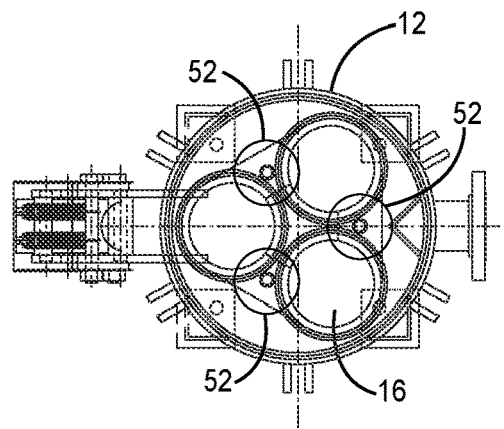
FIGS. 1A and 1B are top and side views of a filter assembly according to some embodiments.

A backwash filter assembly 10 is presented herein and is illustrated in FIGS. 1A-3B. The filter system has a pressure vessel 12 with a cover 14 that is movable to allow access to one or more replaceable filter elements 16 shown in FIG. 4 that have a fabric filter bag 18 retained within an inner filter basket 20 and outer filter basket 22. FIGS. 1A and 1B show a filter assembly 10 having a spring assisted cover 14 while FIGS. 2A and 2B show a filter assembly 10 with a counterweight assisted cover. Other embodiments of the filter assembly may have a single filter element, two filter elements, or more than four filter elements. Yet other embodiments of the filter assembly may also have multiple pressure vessels, each having one or more filter elements.

These filter elements 16 are configured to remove particulates or other contaminants from a pressurized fluid that is delivered into a fluid inlet 24 of the filter assembly and discharged from a fluid outlet of the filter assembly. The filter assembly also includes a pneumatic inlet 28 and a drain outlet 30. The pneumatic inlet 28 and a drain outlet 30 are arranged opposite to the fluid inlet 24 and the fluid outlet 26. To backflush the filter assembly, valves (not shown) controlling the fluid inlet 24 and fluid outlet 26 are closed and valves controlling the pneumatic inlet 28 and drain outlet 30 are opened. The pneumatic inlet 28 provides a stream of pressurized gas, such as compressed air, flowing in a direction opposite of the normal fluid flow through the filter elements 16. This compressed air stream removes particulates on the surface of the filter elements 16 and forces the particulates and remaining fluid in the filter assembly 10 through the drain outlet 30 for disposal. The pneumatic inlet 28 and drain outlet 30 valves are then closed and the fluid inlet 24 and fluid outlet 26 valves are opened to resume normal filtering operation.

Figure 1B:
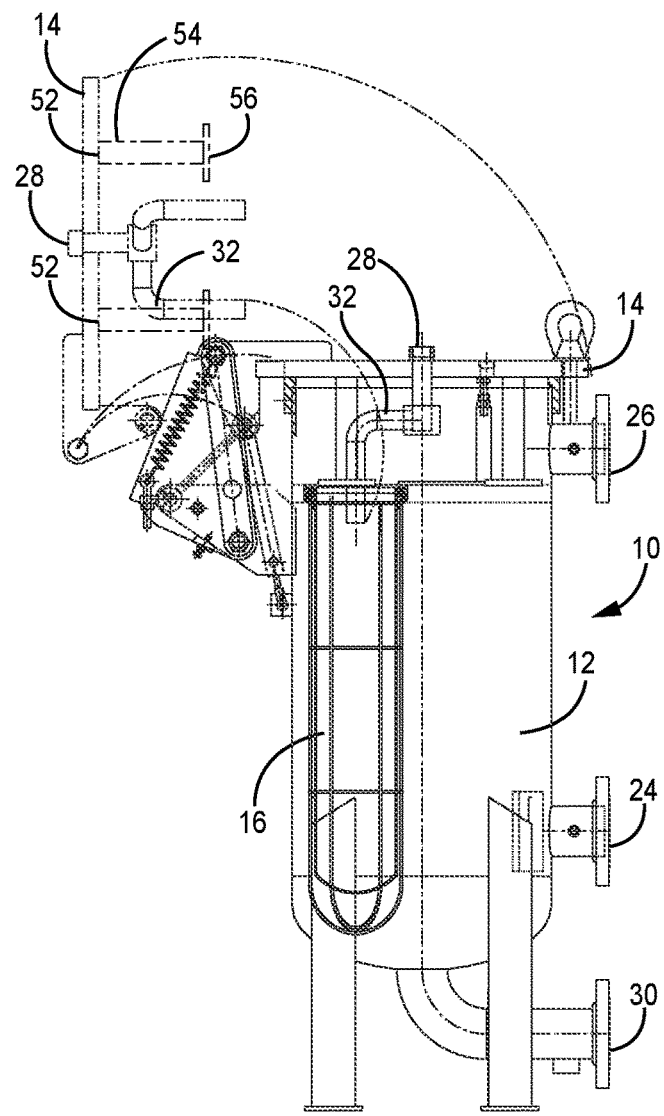
Figure 2A:
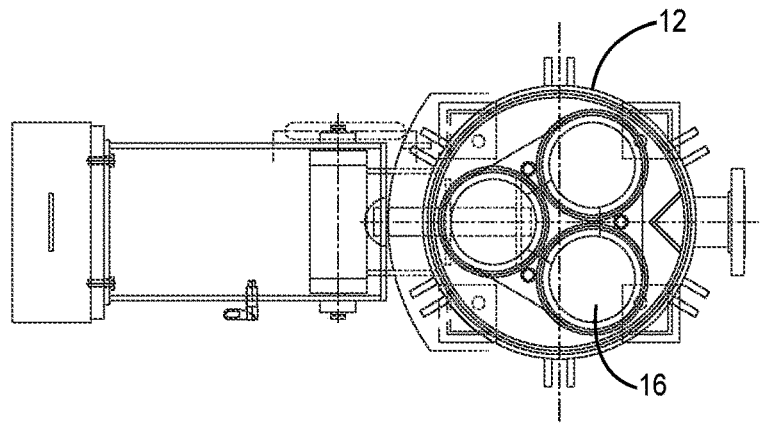
FIGS. 2A and 2B are top and side views of the filter assembly of FIGS. 1A and 1B with an alternative lid opening mechanism according to some embodiments.
Figure 2B:
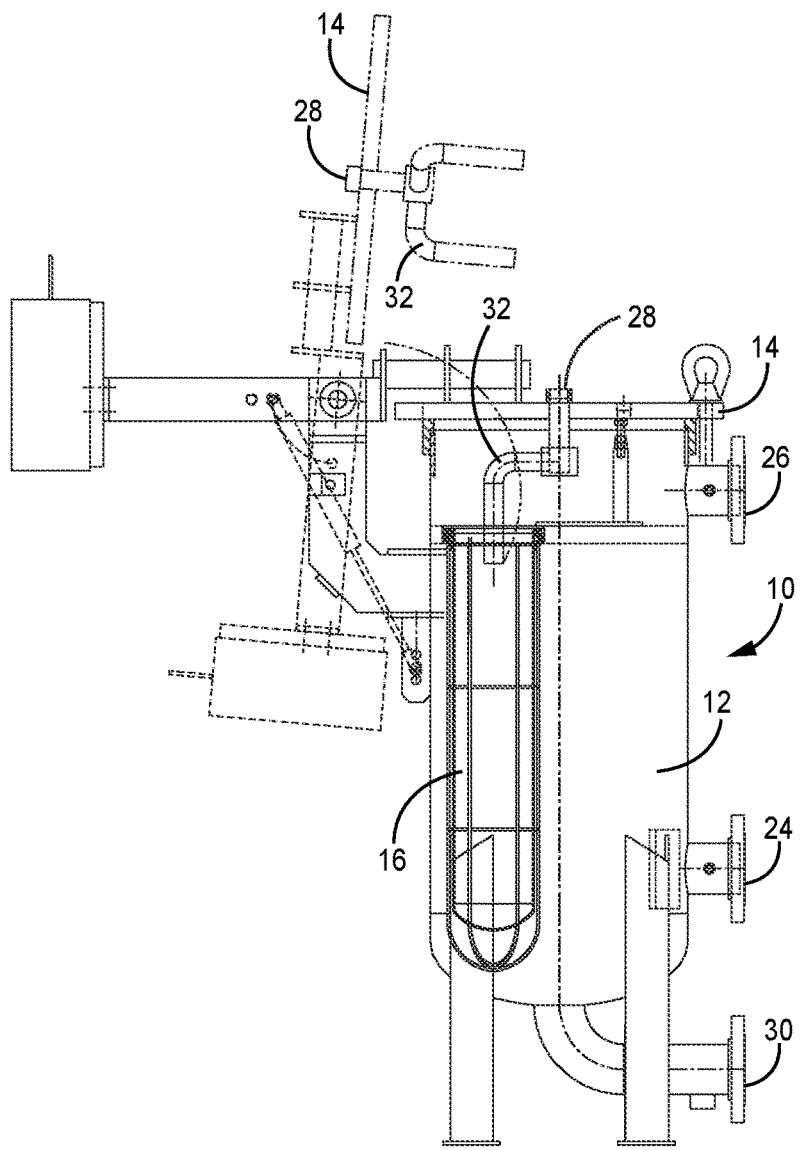

As best shown in FIGS. 1A and 1B, the movable cover 14 of the filter assembly 10 includes a manifold 32 of pneumatic tubes that, when the cover 14 is closed, are positioned over or within the open ends of each of the filter elements 16. These pneumatic tubes are configured to deliver the blast of compressed air to each of the filter elements 16 to backflush the fabric filter bags 18. The integration of the manifold 32 into the moveable cover 14 greatly simplifies the procedures for maintaining and replacing the fabric filter bags 18 in the filter elements 16 since the pneumatic tubes swing away from the filter elements when the cover is opened and do not need to be disassembled to gain access to the fabric filter bags.

In alternative embodiments, the filter assembly may be configured for a fluid backwashing of the filter elements rather than the pneumatic backflush described above.

Figure 5C:
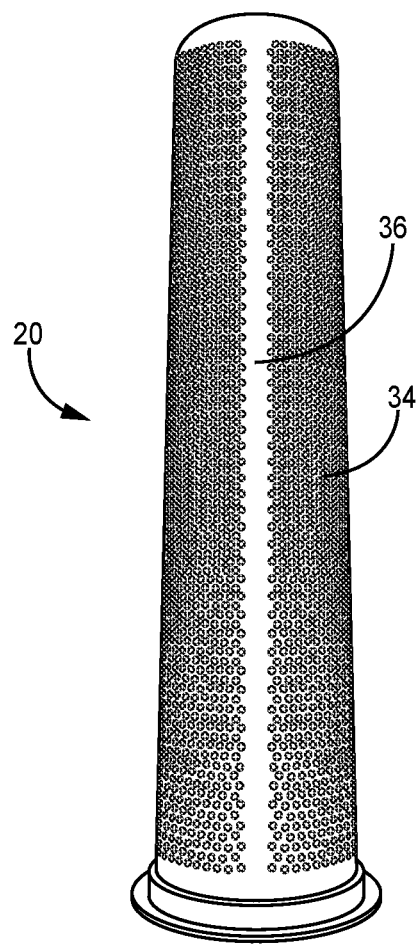
Figure 6:
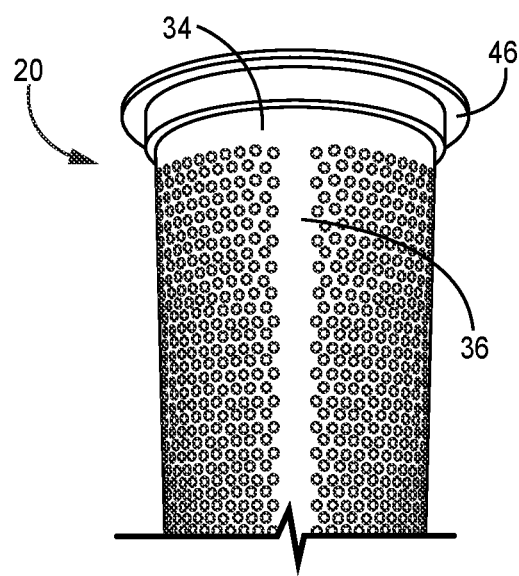
FIG. 6 is a close-up view of the inner filter basket of FIG. 4 according to some embodiments.

The inner filter baskets 20 shown in FIGS. 5 and 6 are made from a sheet of perforated metal, e.g., stainless steel. The sheet is rolled into a tube and the edges 36 are welded together and the weld is then machined to remove any raised seam on the outer surface of the inner basket. This provides an inner filter basket 20 that is much easier to place in a fabric filter bag 18 because it eliminates potential sources of snags formed by a raised welded, crimped, or overlapping seam that make inserting the inner filter basket 20 into the fabric filter bag 18 more difficult and may damage the fabric filter bag 18. The side walls 34 of the inner filter basket are at least 3 mm (0.125 in) thick and do not require inner stiffening rings as previous inner filter basket designs did. The shape of the inner filter basket 20 is preferably cylindrical, but alternatively it may have a frustoconical shape.

Figure 7:
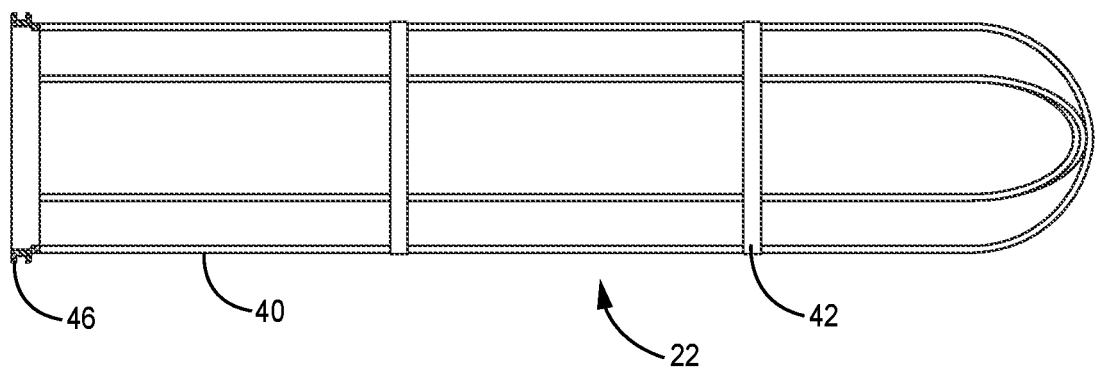
FIG. 7 is a drawing of an outer filter basket of the filter element of FIG. 4 according to some embodiments.

The outer filter basket 22 shown in FIG. 7 has wire loops 40 that are retained by flat metal bands 42 on the outside of the wire loops rather than round metal rings.

Figure 3A:
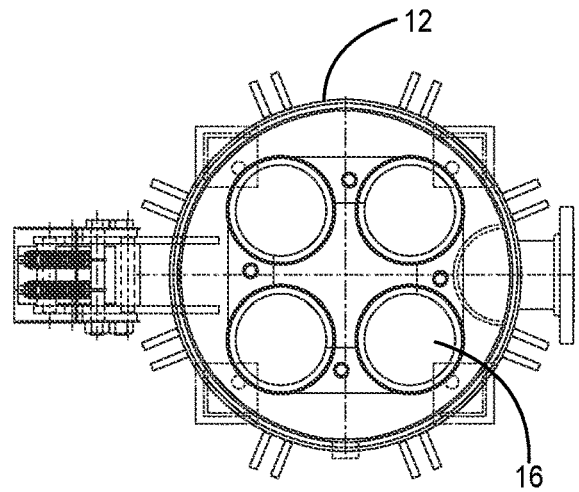
FIGS. 3A and 3B are top and side views of another filter assembly according to some embodiments.
Figure 3B:
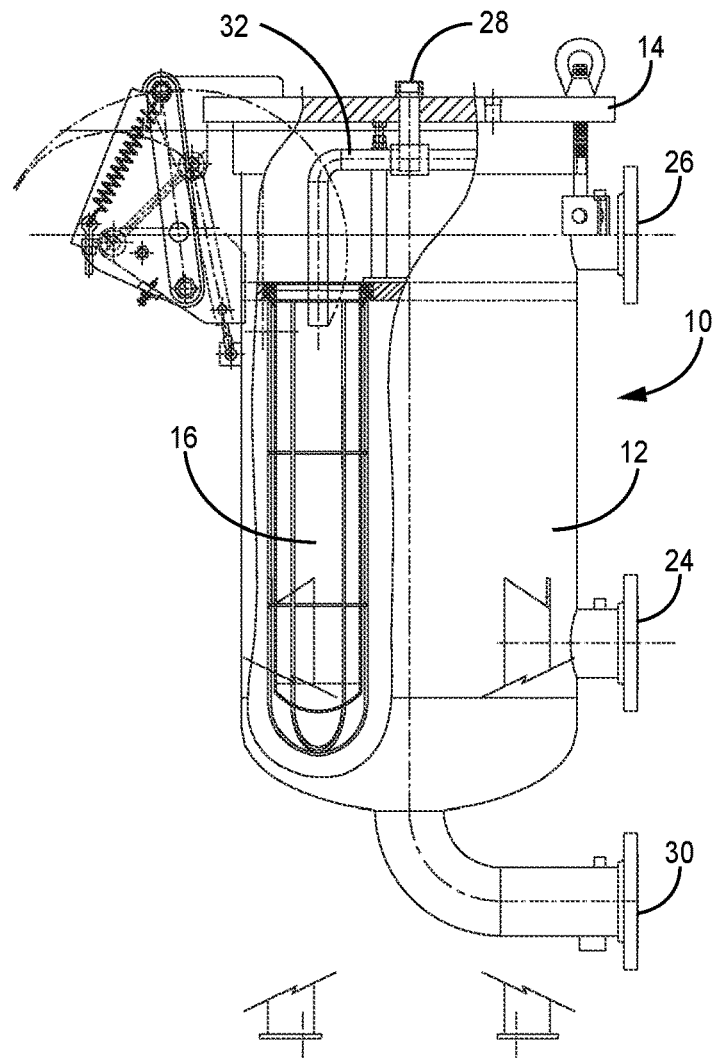
Figure 4:
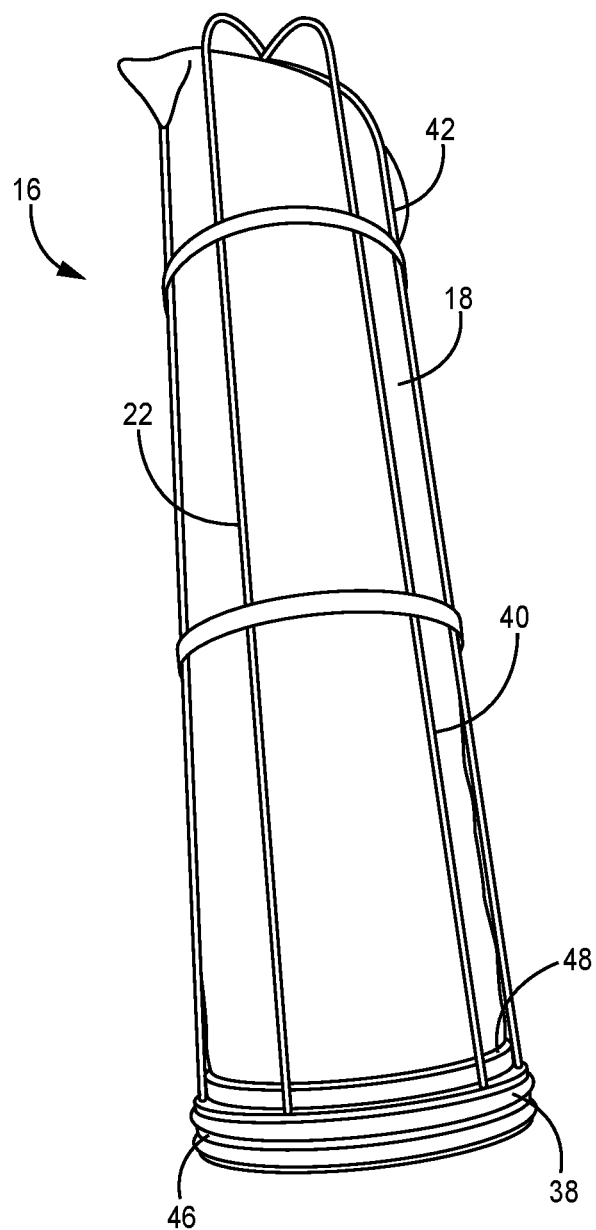
FIG. 4 is a perspective view of a filter element according to some embodiments.
Figure 8A:
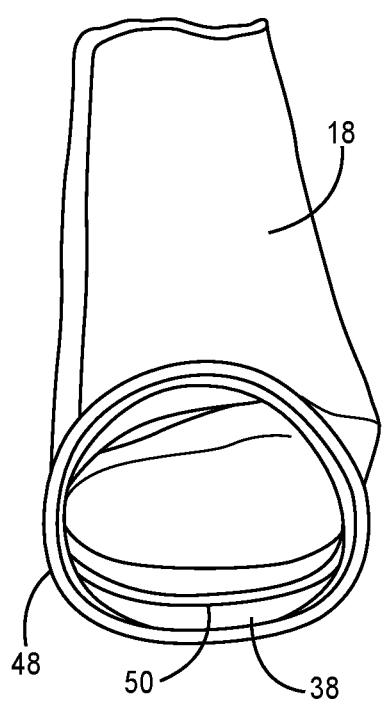
FIGS. 8A and 8B perspective views of a fabric filter bag of the filter element of FIG. 4 according to some embodiments.
Figure 8B:
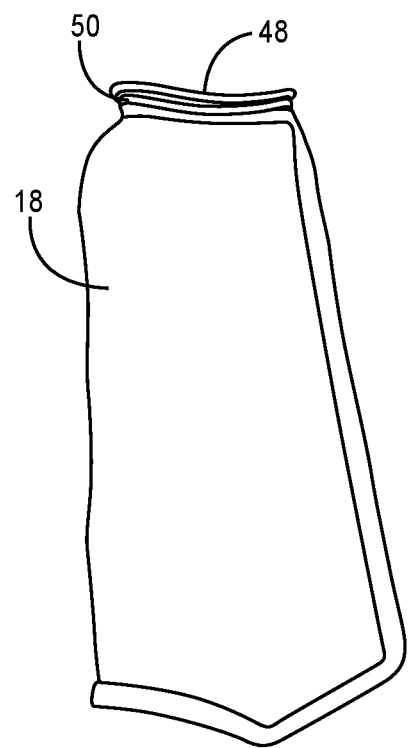
Figure 9A:
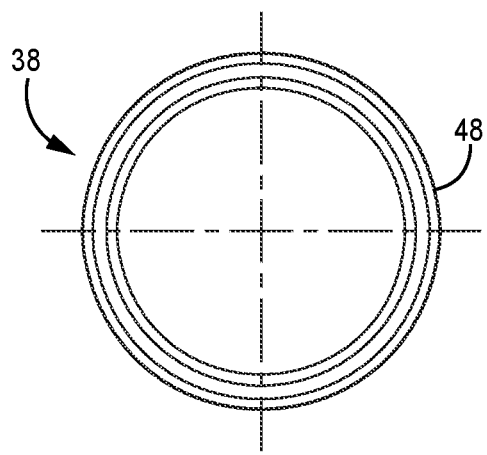
FIGS. 9A-9C are front, side, and rear views of a filter bag flange of the fabric filter bag of FIGS. 8A and 8B according to some embodiments.
Figure 9B:
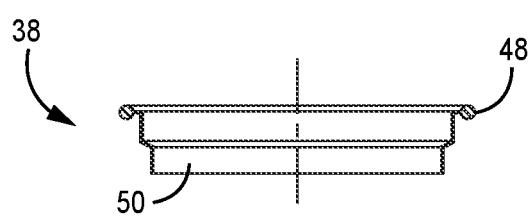
Figure 9C:
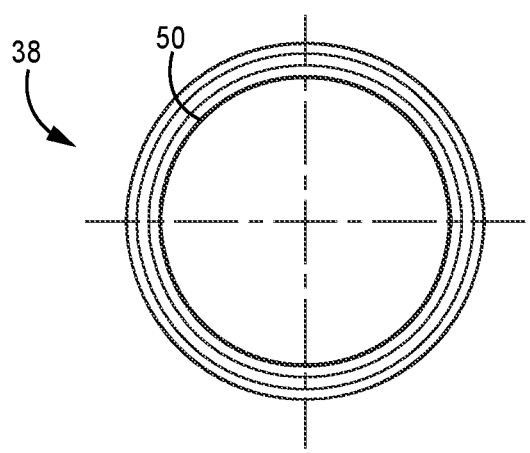
Figure 10:
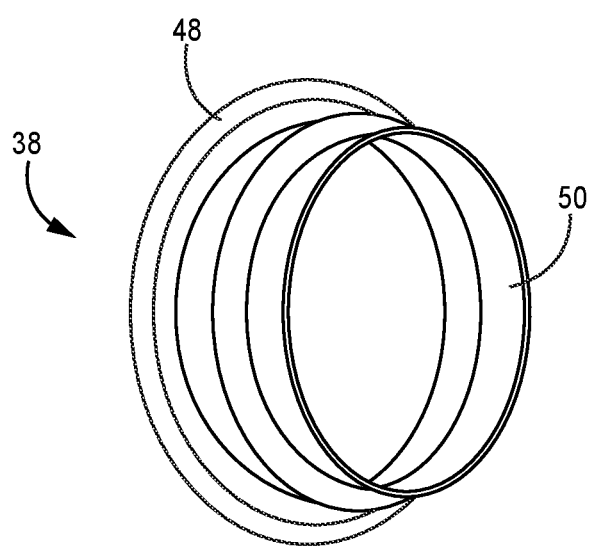
FIG. 10 is a perspective rear view of the filter bag flange of FIGS. 9A-9C according to some embodiments.
Figure 11:
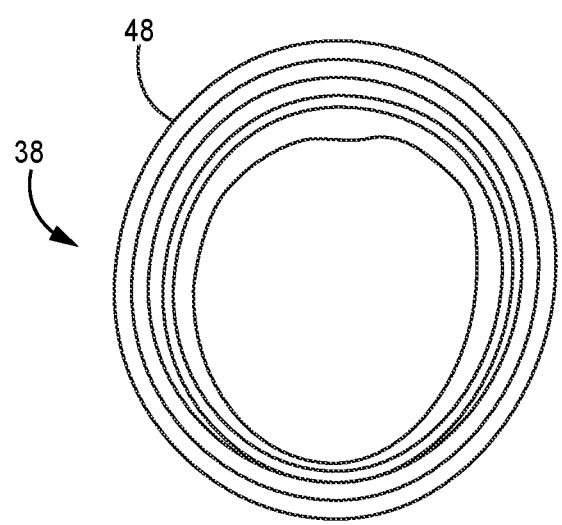
FIG. 11 is a front view of the filter bag flange of FIGS. 9A-9C according to some embodiments.
Figure 12:
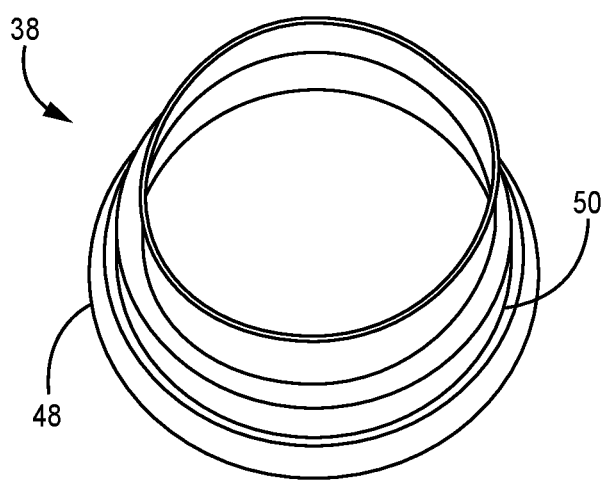
FIG. 12 is another perspective rear view of the filter bag flange of FIGS. 9A-9C according to some embodiments.

The fabric filter bag 18 shown in FIGS. 8A and 8B has a collar or flange 38 shown in FIGS. 9A-12. The flange 38 is located at the open end of the fabric filter bag 18 and is made of an elastomeric rubber, e.g., EPDM or FKM material. Other elastomeric or polymeric materials may also be used, mainly depending on the material requirements of the fluid to be filtered. The flange 38 is sandwiched between metal top brims 44, 46 of the inner and outer filter baskets as shown in FIGS. 3A and 3B. The flange 38 has an O-ring 48 that is integrally formed on an outer edge of the flange 38 that is configured to seal the metal top brim 44 of the inner filter basket 20 to the metal top brim 46 of the outer filter basket 22. The O-ring 48 at least partially seals the flange 38 to the inner and outer basket brims 44, 46 to help reduce bypass of fluid around the filter elements 16 when the filter is in operation. The O-ring 48 may be integrally formed with the flange 38 and made of the same elastomeric material. Alternatively, the O-ring 48 may be formed of a different elastomeric material than the flange 38 that has a different durometer value than the flange material using a two-shot molding process. The open end of the fabric filter bag 18 is attached to a cylindrical neck 50 extending from the flange 38, for example by being sewn to the neck of the flange.

The cover 14 may further include a plurality of hold down features 52 integrated with and extending from an inner surface of the cover 14 that contacts the metal top brims 44 of the inner filter baskets 20 when the cover 14 is closed. These hold down features 52 retain the filter elements 16 in their proper location during operation of the filter assembly 10. Each of the hold down features 52 include a stem 54 having a fixed end attached to the cover 14 and a free end defining a foot 56 that contacts the metal top brim 44 of the inner filter basket 20. The stem 54 may have a cylindrical shape and the foot 56 may have a disk shape with a diameter that is larger than the stem 54. Each filter assembly 10 may be held in place by two or more hold down features 52. The hold down features 52 may be arranged such that one hold down feature 52 may contact the metal top brim 44 of more than one filter assembly 10. These hold down features 52 provide the benefit of eliminating the need to loosen and/or remove threaded fasteners that may be used to individually secure the filter assemblies as was implemented in prior filter designs in order to remove or replace the filter assemblies.

In some aspects, the techniques described herein relate to the filter element, including: an inner filter basket including an elongated tubular portion having a first open end and a first closed end, the tubular portion defining a plurality of perforations therethrough, wherein an outer surface of the tubular portion is seamless and wherein a first annular brim extends outwardly from the open end of the tubular portion; and an outer filter basket having a second open end in which the inner filter basket is received, wherein a second annular brim extends outwardly from the second open end of the outer filter basket, wherein the fabric filter bag is disposed between the inner filter basket and the outer filter basket.

In some aspects, the techniques described herein relate to a filter element, wherein the tubular portion of the inner filter basket has an unperforated strip extending along a longitudinal axis of the tubular portion.

In some aspects, the techniques described herein relate to a filter element, wherein the tubular portion of the inner filter basket has an unperforated strip extending from the open end to the closed end.

In some aspects, the techniques described herein relate to a filter element, wherein the fabric filter bag has an open end and a closed end and wherein a flange defining an elastomeric annular ring is attached to the open end of the fabric filter bag.

In some aspects, the techniques described herein relate to a filter element, wherein the flange is disposed intermediate the first brim and the second brim.

In some aspects, the techniques described herein relate to a filter element, wherein side walls of the inner filter basket are at least 3 mm thick.

In some aspects, the techniques described herein relate to a filter element, wherein the fabric filter bag has an open end and a closed end and a flange defining an elastomeric annular ring attached to the open end of the fabric filter bag.

In some aspects, the techniques described herein relate to a filter element, wherein the flange and the annular ring are integrally formed of the same elastomeric material.

In some aspects, the techniques described herein relate to a filter element, wherein the flange and the annular ring are formed of different elastomeric materials using a two shot molding process.

In some aspects, the techniques described herein relate to a filter element, wherein the flange has a cylindrical portion to which the fabric filter bag is attached.

In some aspects, the techniques described herein relate to a filter element, wherein the flange has a frustoconical section between the cylindrical portion and the annular ring.

In some aspects, the techniques described herein relate to a filter element, wherein an outer edge of the flange has a generally circular cross section and wherein a dimeter of the outer edge is greater than a thickness of the annular ring.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. A filter element, comprising:
   an inner filter basket comprising an elongated tubular portion having a first open end and a first closed end, the tubular portion defining a plurality of perforations therethrough wherein an outer surface of the tubular portion is seamless and a first annular brim extending outwardly from the open end, wherein the tubular portion of the inner filter basket has an unperforated strip extending along a longitudinal axis of the tubular portion; and
   an outer filter basket comprising a plurality of U-shaped wire loops each having a second open end in which the inner filter basket is received, the outer filter basket having a second annular brim extending between ends of the U-shaped wire loops and outwardly from the ends of the U-shaped wire loops, the first closed end of the inner filter basket disposed adjacent the second closed end of the outer filter basket, the filter element having a fabric filter bag is-disposed between the inner filter basket and the outer filter basket.

2. The filter element according to claim 1, wherein the tubular portion of the inner filter basket has the unperforated strip extending from the open end to the closed end.

3. The filter element according to claim 1, wherein the fabric filter bag has an open end and a closed end and wherein a flange defining an elastomeric annular ring is attached to the open end of the fabric filter bag.

4. The filter element according to claim 3, wherein the flange is disposed intermediate the first brim and the second brim.

5. The filter element according to claim 1, wherein side walls of the inner filter basket are at least 3 mm thick.

6. The filter element according to claim 3, wherein the flange and the annular ring are integrally formed of the same elastomeric material.

7. The filter element according to claim 3, wherein the flange and the annular ring are formed of different elastomeric materials using a two shot molding process.

8. The filter element according to claim 3, wherein the flange has a cylindrical portion to which the fabric filter bag is attached.

9. The filter element according to claim 8, wherein the flange has a frustoconical section between the cylindrical portion and the annular ring.

10. The filter element according to claim 3, wherein an outer edge of the flange has a generally circular cross section and wherein a diameter of the outer edge is greater than a thickness of the annular ring.

11. The filter element according to claim 1, wherein the inner filter basket comprises a plurality of metal bands outside of the U-shaped wire loops that are confirmed to retain the U-shaped wire loops.

12. The filter element according to claim 1, wherein the inner filter basket has a generally cylindrical shape.

* * * * *

UNITED STATES PATENT AND TRADEMARK OFFICE
CERTIFICATE OF CORRECTION

PATENT NO. : 12,121,831 B2
APPLICATION NO. : 18/407612
DATED : October 22, 2024
INVENTOR(S) : Jose Ignacio Paz, Dennis Miles Findley and Mark Andrew Lunde It is certified that error appears in the above-identified patent and that said Letters Patent is hereby corrected as shown below:

In the Claims

Claim 1, Line 19 should read "having a fabric filter bag disposed between the inner".

Signed and Sealed this
Nineteenth Day of November, 2024

Katherine Kelly Vidal
*Director of the United States Patent and Trademark Office*